United States Patent [19]

Patzke et al.

[11] Patent Number: 5,454,263
[45] Date of Patent: Oct. 3, 1995

[54] TEST PIECE MANIPULATOR AND CORRESPONDING CYLINDRICAL TEST PIECE WITH STANDARD DEFECTS FOR SETTING ULTRASONIC TEST EQUIPMENT

[75] Inventors: Ottokar Patzke, Erftstadt; Reinhard Prause, Sankt Augustin; Linus Weiss, Ludinghausen, all of Germany

[73] Assignee: Krautkramer GmbH & Co., Germany

[21] Appl. No.: 961,912

[22] PCT Filed: Jun. 29, 1991

[86] PCT No.: PCT/DE91/00537

§ 371 Date: Mar. 1, 1994

§ 102(e) Date: Mar. 1, 1994

[87] PCT Pub. No.: WO92/00823

PCT Pub. Date: Jan. 23, 1992

[30] Foreign Application Priority Data

Jul. 3, 1990 [DE] Germany ................. 40 21 177.0

[51] Int. Cl.⁶ ............... G01D 18/00; G01N 29/26; B66F 11/00
[52] U.S. Cl. ........................... 73/1 DV; 414/590
[58] Field of Search ............... 73/1 DV, 1 R, 73/866.5, 660; 414/590

[56] References Cited

U.S. PATENT DOCUMENTS

| | | |
|---|---|---|
| 3,177,742 | 4/1965 | Basso . |
| 4,361,044 | 11/1982 | Kupperman et al. ............ 73/1 DV X |
| 4,643,055 | 2/1987 | Contogonis ............ 409/233 X |
| 4,660,419 | 4/1987 | Derkacs et al. ............ 73/1 DV X |
| 5,159,838 | 11/1992 | Lynnworth ............ 73/866.5 |

FOREIGN PATENT DOCUMENTS

| | | |
|---|---|---|
| 1182934 | 12/1964 | Germany . |
| 2554052 | 6/1977 | Germany . |
| 1280534 | 12/1986 | U.S.S.R. ............ 73/1 DV |

*Primary Examiner*—Tom Noland
*Attorney, Agent, or Firm*—Eckert Seamans Cherin & Mellott

[57] ABSTRACT

The invention relates to a test-piece manipulator and an appropriate cylindrical test-piece with standard defects for setting ultrasonic test equipment. The test-piece manipulator is connected at its end region to a flange which is axially inserted in the test-piece, shares an axis therewith and has a coaxial axially accessible cone section. The test-piece manipulator has a clamping flange which can rotate about a rotation axis and a counter-cone section arranged concentrically with the rotation axis corresponding to the cone section which is axially accessible.

5 Claims, 1 Drawing Sheet

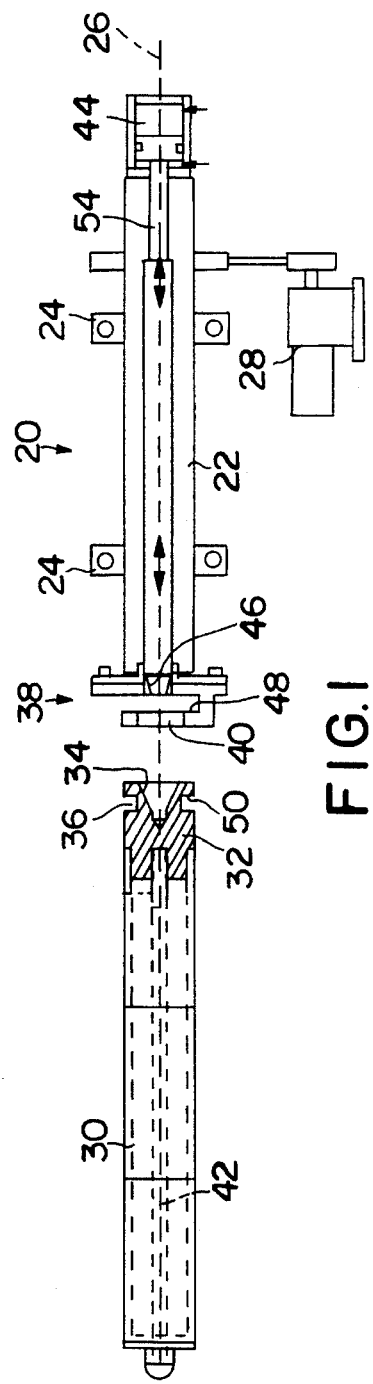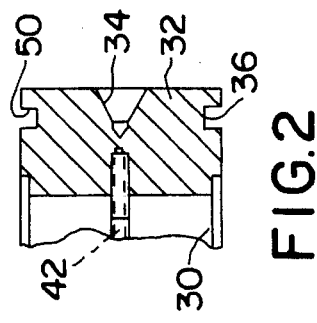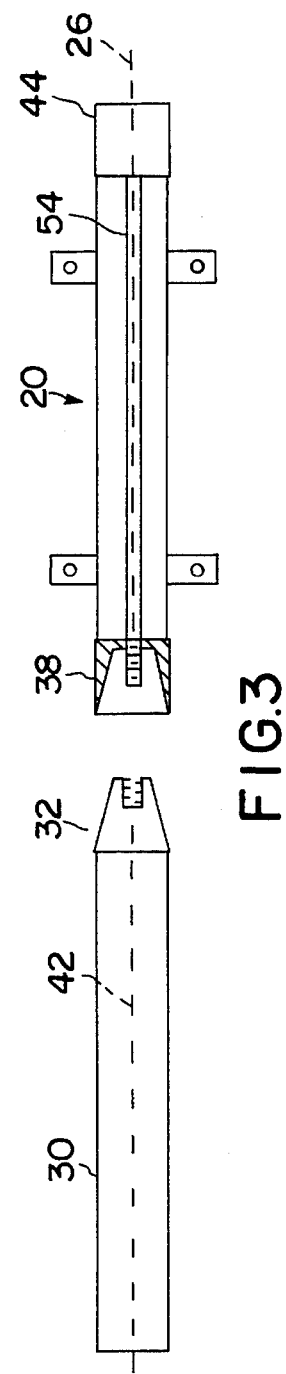

TEST PIECE MANIPULATOR AND CORRESPONDING CYLINDRICAL TEST PIECE WITH STANDARD DEFECTS FOR SETTING ULTRASONIC TEST EQUIPMENT

BACKGROUND OF THE INVENTION

1. Field of the Invention

The invention relates to a test-piece manipulator and a corresponding cylindrical test piece with standard defects.

2. Prior Art

Test pieces with a corresponding manipulator are standards for adjusting ultrasonic test systems for tubes, bars or material with a regular polygonal profile. Ultrasonic test systems of this type will be referred to here as "whole-body test systems." The equipment consisting of the test-piece manipulator and the test piece is used to set the test mechanics and test electronics of such whole-body test systems. The test pieces (calibration standards) are precisely positioned in the whole-body test equipment by the test-piece manipulator.

Test pieces usually have several types of defects, depending on the test function. These defects are incorporated in different positions on the circumference and length of the test piece. To be able to detect all such defects (standard defects), it must be possible, on the one hand, to move the test piece into each position in its longitudinal axis relative to the whole-body test equipment. On the other hand, it must be possible to rotate it about its longitudinal axis and to perform oscillation movements, if necessary.

Standards and, in some cases, delivery contracts prescribe the intervals at which a whole-body test system must be tested to maintain predetermined production quality. For example, the probes become contaminated or worn during operation. To obtain the same electrical displays for the same defects in all cases, it may be necessary to adjust the amplification. Other tests of the system itself are necessary from time to time.

This type of testing and adjustment of a whole-body test system always means a loss of production. Therefore, an effort must be made to keep the adjusting and testing time as short as possible. To accomplish this, it is necessary to change test pieces quickly and with the greatest possible automation.

The term whole-body test system is defined here as a system for testing tubes, bars or regular polygonal profiles, in which the profile to be tested is moved axially. In addition, a rotary movement is performed, in which either a rotor is rotated about the axis of the profile (test piece) to be tested, or the test piece itself is rotated. In both cases, helical test tracks are obtained. Test systems of this type are described, for example, in J. and H. Krautkrämer: Werkstoffprüfung mit Ultraschall [Materials Testing with Ultrasound], 4th ed., pp. 442–461.

In the practical course of an adjustment of a whole-body test system, the rotor or probe carrier is generally moved from the test position into a service position; this is performed horizontally. In this position, a test piece is moved into the rotor or probe carrier by the test-piece manipulator.

Test-piece manipulators currently in use have a chuck of the type also used in turning and drilling machines. The test pieces themselves are tubes or bars, possibly comprising several partial sections. Division into several partial sections is necessary when defects are to be introduced into the test pieces from the inside.

DE-B-1182931 describes a coupling on machine tools, especially milling and drilling machines, for clamping and releasing tools. This coupling is provided with a spindle, which forms a conical counterpart at its forward end and through which a threaded clamping rod passes. The shafts of the tools have a cone with internal threading, into which the clamping rod can fit.

Setting a test system with the previously known test-piece manipulator and the accompanying test pieces requires a relatively great amount of time. The test pieces cannot be inserted by an automatic machine, e.g., a robot, into the chuck or the previously known test-piece manipulator and centered, but rather manual alignment is necessary. For this reason, the previously known test pieces are also provided with a grip or projection on their free end region when they are clamped in, which allows better centering in the chuck.

Proceeding on the basis of this state of the art, the goal of the invention was to develop a test piece and a corresponding test-piece manipulator, which allows automated insertion of a test piece in the manipulator, thereby creating a situation in which the test pieces can be drawn from a magazine mechanically, clamped into the test-piece manipulator and run into the test equipment without the agency of a human being.

SUMMARY OF THE INVENTION

In accordance with the invention, each test piece has a clamping flange which is securely connected to the test piece, for example, by a releasable screw connection or by welding. It has a conical part, which is designed as a positively projecting cone, for example, a truncated cone, or as a conical recess. This conical part fits together with its conical counterpart in the test-piece manipulator in such a way that the test piece can be inserted in the holding flange with rough alignment at first, and then the test piece can be precisely centered by tightening the clamping device, which brings the two conical parts into an exactly fitting position. In this way, it is possible, without any manual assistance, to clamp a test piece into the test-piece manipulator so precisely that the setting of a whole-body test system can be performed.

The conical counterpart of the test-piece manipulator is mounted in such a way that it can be moved in the axial direction, for example, elastically or controllably by an axially operating lifting device. In this way, only a rough fitting of the test piece into the clamping flange is necessary at first. The required centric alignment is then achieved by movement of the conical counterpart and actuation of the clamping device.

Furthermore, it is advantageous to further modify this last design in such a way that a radial stop shoulder is provided on the flange of the test piece, and that the clamping flange of the test-piece manipulator has a stop corresponding to the stop shoulder. This allows precise axial positioning of the test piece with respect to the test-piece manipulator.

The clamping device is designed as an axial spindle, which is axially accessible in the end region of the clamping flange, where it has the conical counterpart or threading. By advancing the spindle, the conical counterpart is moved into or up to the only roughly aligned test piece. Centering is achieved in this way.

A groove is provided on the flange of the test piece. The holding flange of the test-piece manipulator has a forked, radially accessible holding fixture for this groove, which, upon lateral insertion of the test-piece flange into the holding flange, grips the test piece with considerable play and holds it in this position.

Additional features and advantages of the invention are apparent from the secondary claims and from the following description of specific embodiments of the invention, which are explained in greater detail with reference to the drawings. These specific examples in no way limit the invention.

BRIEF DESCRIPTION OF THE DRAWINGS

FIG. 1 shows a top view of a test-piece manipulator and a test piece in the form of a tube; the latter is shown in a sectional view.

FIG. 2 shows a cross section through a flange and an adjacent partial section of a test piece similar to FIG. 1, but for a larger tube diameter.

FIG. 3 is a schematic representation of an alternative embodiment in accordance with the invention.

DETAILED DESCRIPTION OF THE PREFERRED EMBODIMENTS

The test-piece manipulator 20 shown in FIG. 1 has an essentially tubular housing 22, which is surrounded by two axially displaced roller bearing blocks 24, which allow rotation about an axis of rotation 26. This rotational movement is produced by a geared motor 28. It turns the manipulator at a low rotational speed, e.g., one to two revolutions per minute, or lets it oscillate.

FIG. 1 also shows a cylindrical test piece to the left of the manipulator 20. As the drawing shows, one end region of the test piece 30 has a flange 32, which is inserted axially in the tube end of the test piece 30, runs coaxially with the test piece itself, and has a conical part 34 in its axial end region. In FIG. 1 the conical part 34 is designed as a recess shaped like a conical frustum. In the example shown in FIG. 1, the flange is also provided with a groove 36. The flange 32 is screwed together with the actual cylindrical test piece by means of a central rod with threading at its end. It screws into internal threading in the flange 32 (at the right end) and is screwed on at the left end after passing through a washer.

The test-piece manipulator 20 has a clamping flange 38 at its left end. In the example shown in FIG. 1, it has a forked holding device 40, which is U-shaped when viewed axially. It fits into the groove 36 with a good amount of play. It serves to hold the test piece 30 temporarily and to position it axially.

When a test piece 30 is automatically removed from a magazine and conveyed to the test-piece manipulator 20, it is initially suspended there in such a way that the forked holding device 40 fits into the groove 36. The test piece 30 is initially held in this state, but its axis is still not coaxial with the axis of rotation 26 of the test-piece manipulator 30, but rather there may be a considerable angular difference of 10° or more.

A rod 54 is mounted in the housing 22 of the test-piece manipulator in such a way that it can be moved axially by a pneumatic drive 44 on the right side of the housing 22. In its free end region, the rod 54 has a frustum-shaped conical counterpart 46; in the position shown in FIG. 1, this part is completely drawn back, so as not to hinder the above-described insertion of the test piece 30 in the clamping flange 38. If the conical counterpart 46 is now moved to the left by the pneumatic drive 44, it engages the conical part 34 and brings about increasing centering. The centering is complete when the conical parts 34, 46 are fully seated; in this state the axes 26, 42 coincide. In this connection, one inner surface 48 of the holding device 40 acts as a stop; a shoulder 50 of the flange 32 rests against it. In this way, axial positioning is achieved between the test piece 30 and the test-piece manipulator 20.

To achieve further improvement of the fit between the two conical parts 34, 46, it was found to be advantageous to heat the engaging conical part, i.e., for example, in FIG. 2, the positive conical part 34, e.g., by providing a heating unit and constructing it from a material with greater thermal expansion than the corresponding conical part, e.g., 46.

In the specific embodiments of the invention shown here, the flange 32 of the test piece 30 always has the same outer contour as the actual test piece. This is very advantageous but not necessary. Rather, the flange 32 may be significantly larger in outer diameter than the actual test piece or vice versa. In a first design, four different flange types are provided, e.g., with outer diameters of 20, 40, 10 and 140 mm. These flanges are assigned to corresponding clamping flanges 38, which, for this reason, are interchangeable. FIG. 1 shows an interchangeable clamping flange 38.

FIG. 2 shows an embodiment of the invention for a larger type of flange; here the outer diameter is 140 mm.

Changing clamping flanges 38 of the test-piece manipulator 20 becomes unnecessary when all test pieces 30 are provided with a uniform flange 32 of the same construction. In this case, however, the advantage that the flange 32 has essentially the same outer diameter as the actual test piece is not always achieved.

The conical angle of the conical parts 34, 46 is preferably between 30° and 45°.

We claim:

1. A test-piece manipulator and a corresponding, cylindrical test piece with standard defects for setting ultrasonic test equipment, wherein the test-piece manipulator has a clamping flange, and the test piece is connected at one end region thereof with a flange, which is axially inserted in the test piece, is coaxial with the test piece, and has a coaxial, axially accessible conical coupling part, the clamping flange of the test-piece manipulator being rotatable about an axis of rotation and having a conical coupling counterpart, which is arranged concentrically to this axis of rotation, corresponds to the conical coupling part, and is axially accessible, the clamping flange being provided with a holding device, which is radially accessible, the clamping flange being connected to a housing, which can be rotated about an axis of rotation by means of bearings, and wherein at least one of the conical coupling part and the conical coupling counterpart can be axially displaced with respect to the clamping flange.

2. The test-piece manipulator and test piece in accordance with claim 1, wherein the flange is provided with a stop shoulder and a corresponding stop is formed on the clamping flange.

3. The test-piece manipulator and test piece in accordance with claim 1, wherein the test piece manipulator comprises a clamping device in the form of an axial spindle, which is axially accessible in the end region of the clamping flange, where it bears the conical counterpart, and the flange is provided with a groove, into which the holding device can fit.

4. The test-piece manipulator and test piece in accordance with claim 1, wherein one of the conical coupling part and counterpart is shaped as a positive cone and comprises a heating unit, said one of the conical coupling part and counterpart being made of material with greater thermal expansion the other of said conical coupling part and counterpart.

5. The test-piece manipulator and test piece in accordance with claim 1, further comprising a clamping device with a threaded axial spindle, whereby the conical coupling part and counterpart are advanced for centering.

* * * * *